US012802250B2

(12) United States Patent
Dai et al.

(10) Patent No.: US 12,802,250 B2
(45) Date of Patent: Nov. 17, 2026

(54) ALL-OPTICAL INTELLIGENT COMPUTING THREE- DIMENSIONAL PERCEPTION SYSTEM AND DEVICE

(71) Applicant: TSINGHUA UNIVERSITY, Beijing (CN)

(72) Inventors: Qionghai Dai, Beijing (CN); Lu Fang, Beijing (CN); Tao Yan, Beijing (CN); Tiankuang Zhou, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 206 days.

(21) Appl. No.: 18/753,420

(22) Filed: Jun. 25, 2024

(65) Prior Publication Data

US 2025/0139801 A1 May 1, 2025

(30) Foreign Application Priority Data

Oct. 27, 2023 (CN) ......................... 202311411802.7

(51) Int. Cl.
*G06T 7/521* (2017.01)
*G06V 10/764* (2022.01)

(52) U.S. Cl.
CPC ............ *G06T 7/521* (2017.01); *G06V 10/764* (2022.01); *G06T 2207/20081* (2013.01); *G06T 2207/20084* (2013.01)

(58) Field of Classification Search
CPC ........... G06T 7/521; G06T 2207/20081; G06T 2207/20084; G06V 10/764; G06V 10/145;

(Continued)

(56) References Cited

U.S. PATENT DOCUMENTS

| | | | | |
|---|---|---|---|---|
| 11,450,017 | B1 * | 9/2022 | Fang | G06T 7/557 |
| 2018/0255289 | A1 * | 9/2018 | Piestun | H04N 13/254 |
| 2022/0366253 | A1 * | 11/2022 | Ozcan | G06V 10/95 |

FOREIGN PATENT DOCUMENTS

| | | |
|---|---|---|
| CN | 113237437 | 8/2021 |
| CN | 115661808 A * | 1/2023 |

OTHER PUBLICATIONS

Xu, Z. et al., "A multichannel optical computing architecture for advanced machine vision," 2022, Light Sci Appl 11:255, pp. 1-13. (Year: 2022).*

(Continued)

*Primary Examiner* — Emily C Terrell
*Assistant Examiner* — Daniella M. DiGuglielmo
(74) *Attorney, Agent, or Firm* — Hodgson Russ LLP

(57) ABSTRACT

An optical superpixel modeling and training method for three-dimensional perception for arbitrarily shaped objects, applied to an all-optical intelligent computing three-dimensional perception device, the method comprises: constructing first training data based on a preset first superpixel optimized region; training first neuron data in an encoding diffractive surface and a decoding diffractive surface of a superpixel using the first training data, to determine first target depth information according to depth information in a spatial pattern of a structured light of an encoding superpixel and a reflected optical pattern of the structured light of a decoding superpixel; and mapping the first target depth information to a light intensity of a region of interest of an the output plane by an intelligent optimized optical connection; and obtaining, by the photodetector, the light intensity information on the output plane for the depth information acquisition to achieve the three-dimensional perception.

8 Claims, 13 Drawing Sheets

(58) Field of Classification Search
CPC .... G06V 10/82; G06V 20/64; G01B 11/2513; G01B 11/254; G01B 11/22; G02B 27/4205; G06N 3/02; G06N 3/08; G06N 3/084; H04N 13/254
See application file for complete search history.

(56) References Cited

OTHER PUBLICATIONS

CNIPA, First Office Action for CN Application No. 202311411802.7, Dec. 5, 2023.

* cited by examiner

Aop3D all-optical obstacle avoidance scene

ALL-OPTICAL INTELLIGENT COMPUTING THREE- DIMENSIONAL PERCEPTION SYSTEM AND DEVICE

CROSS-REFERENCE TO RELATED APPLICATIONS

This application claims priority to Chinese Patent Application No. 202311411802.7, filed on Oct. 27, 2023, the entire disclosure of which is incorporated herein by reference.

TECHNICAL FIELD

The present disclosure relates to the fields of optical computing, depth detection and three-dimensional perception technologies, in particular to an all-optical intelligent computing three-dimensional perception system and an all-optical intelligent computing three-dimensional perception device.

BACKGROUND

Three-dimensional perception provides a brilliant representation and understanding of depth information in the physical world, and achieves unprecedented innovations in various fields, such as building industry, virtual reality, and automatic driving. Humans have been pursuing a simple and effective three-dimensional perception technique to better perceive the world.

SUMMARY

A first aspect of the present disclosure provides an optical superpixel modeling and training method for a three-dimensional perception for an arbitrarily shaped object, applied to an all-optical intelligent computing three-dimensional perception device, wherein the all-optical intelligent computing three-dimensional perception device comprises: a solid state laser, an encoding diffractive surface, a plurality of optical elements, a decoding diffractive surface, and a photodetector; wherein, the solid state laser is configured to generate a laser beam; the encoding diffractive surface consists of a phase modulator based on encoding phase modulation information, is configured to modulate a wave-front phase based on the laser beam to generate a structured light with spatial pattern varying with depth; the plurality of optical elements are configured to irradiate the generated structured light onto a surface of an object; the decoding diffractive surface consists of a phase modulator based on decoding phase modulation information, is configured to map depth information in the structured light reflected by the object to a light intensity of an output plane; and the photodetector is configured to obtain light intensity information on the output plane for a depth information acquisition to achieve a three-dimensional perception. The method includes:

- constructing first training data based on a preset first superpixel optimized region;
- training first neuron data in an encoding diffractive surface and a decoding diffractive surface of a superpixel using the first training data, to determine first target depth information according to depth information in a spatial pattern of a structured light of an encoding superpixel and a reflected optical pattern of the structured light of a decoding superpixel;

- mapping the first target depth information to a light intensity of a region of interest (ROI) of an output plane by an intelligently optimized optical connection; and
- obtaining, by the photodetector, the light intensity information on the output plane for the depth information acquisition to achieve the three-dimensional perception.

A second aspect of the present disclosure provides a superpixel classification modeling and training method for a robust three-dimensional perception for an arbitrarily shaped object under different illumination and reflectivity conditions, applied to an all-optical intelligent computing three-dimensional perception device, wherein the all-optical intelligent computing three-dimensional perception device comprises: a solid state laser, an encoding diffractive surface, a plurality of optical elements, a decoding diffractive surface, and a photodetector; wherein, the solid state laser is configured to generate a laser beam; the encoding diffractive surface consists of a phase modulator based on encoding phase modulation information, is configured to modulate a wave-front phase based on the laser beam to generate a structured light with spatial pattern varying with depth; the plurality of optical elements are configured to irradiate the generated structured light onto a surface of an object; the decoding diffractive surface consists of a phase modulator based on decoding phase modulation information, is configured to map depth information in the structured light reflected by the object to a light intensity of an output plane; and the photodetector is configured to obtain light intensity information on the output plane for a depth information acquisition to achieve a three-dimensional perception. The method includes:

- constructing second training data based on a preset second superpixel optimized region;
- training second neuron data in an encoding diffractive surface and a decoding diffractive surface of a superpixel using the second training data, to determine second target depth information according to depth information in a spatial pattern of a structured light of an encoding superpixel and a reflected optical pattern of the structured light of a decoding superpixel;
- classifying the second target depth information into a first preset number of depth intervals, and mapping the first preset number of depth intervals to a second preset number of preset regions on an output plane, to determine a region where a maximum light intensity is located as a classification result; and
- obtaining, by the photodetector, the light intensity information on the output plane for the depth information acquisition to achieve the three-dimensional perception.

A third aspect of the present disclosure provides an optical global modeling and training method for an object with priori shape information, applied to an all-optical intelligent computing three-dimensional perception device, wherein the all-optical intelligent computing three-dimensional perception device comprises: a solid state laser, an encoding diffractive surface, a plurality of optical elements, a decoding diffractive surface, and a photodetector; wherein, the solid state laser is configured to generate a laser beam; the encoding diffractive surface consists of a phase modulator based on encoding phase modulation information, is configured to modulate a wave-front phase based on the laser beam to generate a structured light with spatial pattern varying with depth; the plurality of optical elements are configured to irradiate the generated structured light onto a surface of an object; the decoding diffractive surface consists of a phase modulator based on decoding phase modulation information, is configured to map depth information in the structured light reflected by the object to a light intensity of an output plane; and the photodetector is configured to obtain light intensity information on the output plane for a depth information acquisition to achieve a three-dimensional perception. The method includes:

constructing third training data based on an optimized region with a global size;

training third neuron data in an encoding diffractive surface and a decoding diffractive surface of a superpixel using the third training data, to form the encoding diffractive surface and the decoding diffractive surface according to depth information in a spatial pattern of a structured light of an encoding superpixel and a reflected optical pattern of the structured light of a decoding superpixel;

obtaining, by the photodetector, the light intensity information on the output plane for the depth information acquisition to achieve the three-dimensional perception; and retrieving a region depth according to a preset demand based on a light intensity of an output region of the encoding diffractive surface and the decoding diffractive surface.

BRIEF DESCRIPTION OF THE DRAWINGS

The foregoing and/or additional aspects and advantages of the present disclosure will become apparent and readily understood from the following description of the embodiments in combination with the accompanying drawings.

DETAILED DESCRIPTION

Figure 1:
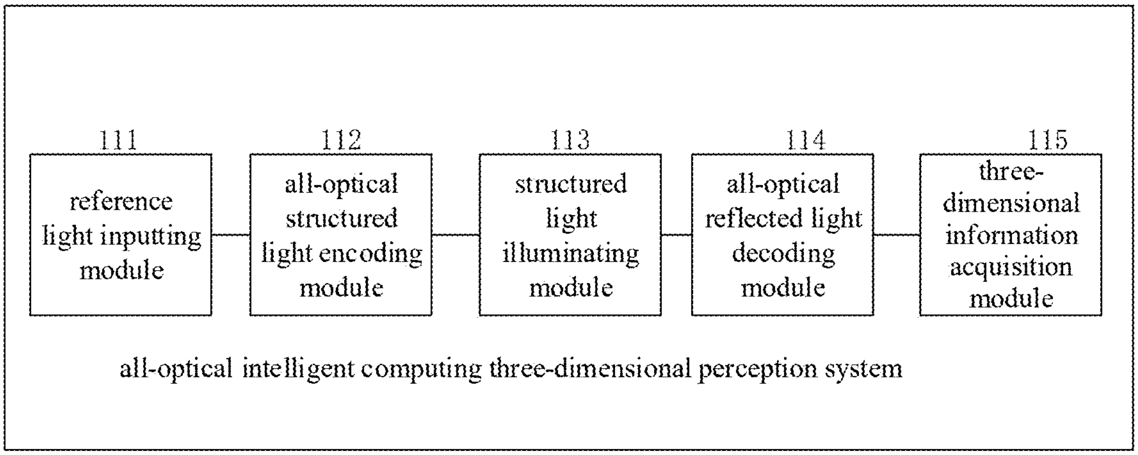
FIG. 1 is a block diagram of an all-optical intelligent computing three-dimensional perception system according to an embodiment of the present disclosure.

It is noted that the embodiments of the present disclosure and the features in the embodiments may be combined with each other without conflict. The present disclosure is described in detail below in the embodiments with reference to the accompanying drawings.

In order to enable those skilled in the art to better understand the scheme of the present disclosure, the technical solutions in the embodiments of the present disclosure will be clearly and completely described below in combination with the accompanying drawings in the embodiments of the present disclosure. Obviously, the described embodiments are only a part of the embodiments of the present disclosure, and not all of the embodiments of the present disclosure. Based on the embodiments in the present disclosure, all other embodiments obtained by those skilled in the art without inventive works shall fall within the scope of protection of the present disclosure.

Three-dimensional perception provides a brilliant representation and understanding of depth information in the physical world, and achieves unprecedented innovations in various fields, such as building industry, virtual reality, and automatic driving. Humans have been pursuing a simple and effective three-dimensional perception technique to better perceive the world. However, the existing three-dimensional perception methods face huge challenges in acquiring three-dimensional images directly using an optical system, the depth information inherently contained in the propagation of light field is lost when captured by conventional two-dimensional cameras. Stereo vision methods, for example, use feature matching, computational stereo and deep learning algorithms to estimate differences between multi-view two-dimensional images to obtain a three-dimensional image. However, complex post-processing imposes a heavy computational burden on the electronic hardware, which limits the speed and applicability of three-dimensional perception, especially in the case of increasing model complexity in the artificial neural network (ANN) basic method. Compared with completely relying on the post-processing, directly interfering with the optical process of the three-dimensional perception can reduce the computational burden of electronic hardware. For example, a light detection and ranging (LiDAR) solution mainly uses time of flight (ToF) or frequency modulated continuous wave (FMCW) to realize three-dimensional perception without complex reconstruction algorithms. However, this solution needs to realize precise scanning and accurate time or frequency measurement, which leads to the bottleneck of parallel detections. Nowadays, no three-dimensional perception technique can be as widely used as the two-dimensional imaging sensor. With the deepening of the exploration of the physical essence of three-dimensional perception, in the present disclosure, it is desirable to directly obtain a depth image through an optical imaging device, that is, to obtain the depth information in an optical manner without post-processing. Benefiting from the advantages of energy efficiency and speed, a field of optical computing technology triggeres a research boom in recent years. For example, a diffractive surface can transmit light from an input field of view (FoV) to an output FoV with a specific modulation. By modulating light propagation and utilizing its physical properties, the diffractive surface has realized all optical linear transformation, image classification, pulse shaping, and wave sensing and logical operation. Using optical computing to promote three-dimensional perception will provide unprecedented possibilities for high-speed and low-power application scenarios, including ultra-fast obstacle avoidance in automatic driving, low-power unmanned system, energy-saving smart factory, and the like.

The all-optical intelligent computing three-dimensional perception system, method and device are described below with reference to the accompanying drawings.

It can be understood that the demand for automatic vehicles has driven huge advances in three-dimensional perception technology. However, existing technologies, such as stereo vision cameras and LiDAR, require complex post-processing or point-by-point scanning, so that the computational burden of the hardware is heavy and the operating speed is slow. The present disclosure provides the all-optical intelligent computing three-dimensional perception system, to realize three-dimensional perception at a speed of light without post-processing. The present disclosure encodes depth information into an optical pattern of custom structured light and decodes it into an output light intensity through an optical interconnection optimized by a diffractive surface. Three-dimensional perception without post-processing is accomplished during a light propagation process on a passive surface, and a captured light intensity directly reflects a depth image.

FIG. 1 is a diagram of an all-optical intelligent computing three-dimensional perception system according to an embodiment of the present disclosure.

As illustrated in FIG. 1, the system includes a reference light inputting module 111, an all-optical structured light encoding module 112, a structured light illuminating module 113, an all-optical reflected light decoding module 114 and a three-dimensional information acquisition module 115.

The reference light inputting module 111 includes a solid state laser with a working wavelength, and the solid state laser is configured to generate a laser beam.

The all-optical structured light encoding module 112 includes an encoding diffractive surface consisting of a phase modulator based on encoding phase modulation information, and the encoding diffractive surface is configured to modulate a wave-front phase based on the laser beam to generate a structured light with a spatial pattern varying with depth.

The structured light illuminating module 113 includes a plurality of optical elements, and the optical elements are configured to irradiate the generated structured light onto a surface of an object.

The all-optical reflected light decoding module 114 includes a decoding diffractive surface consisting of a phase modulator based on decoding phase modulation information, and the decoding diffractive surface is configured to map depth information in the structured light reflected by the object to a light intensity on an output plane.

The three-dimensional information acquisition module 115 is configured to obtain light intensity information on the output plane by using a photodetector for depth information acquisition to achieve three-dimensional perception.

In detail, the reference light inputting module 111 generates the laser beam by the solid state laser with the working wavelength to provide a system working light source. The all-optical structured light encoding module 112 is accomplished by modulating the wavefront phase using the encoding diffractive surface consisting of the phase modulator with the encoding phase modulation information, to generate the structured light with the spatial pattern varying with depth. The structured light illuminating module 113 is accomplished by beam splitters and other optical elements to irradiate the generated structured light onto the surface of the object. The all-optical reflected light decoding module 114 is accomplished by the decoding diffractive surface consisting of the phase modulator with the decoding phase modulation information, to map the depth information in the structured light reflected by the object to the light intensity of the output plane. The light intensity of the output plane directly reflects a depth image, and the three-dimensional information acquisition module 115 obtains the light intensity information on the output plane captured by the photodetector, to realize the depth information acquisition and complete three-dimensional perception.

It is understood that the intelligent diffractive surface of the present disclosure consists of a phase modulator. The phase modulator may be realized by using a SLM or a phase plate made of a specific material. The phase modulator can determine the amplitude modulation coefficient and the phase modulation coefficient of each pixel for the light, and each pixel is an optical neuron. The intelligent diffractive surfaces form a neural network with a specific function through free space propagation, to realize tasks such as intelligent computation and feature learning.

Figure 2:
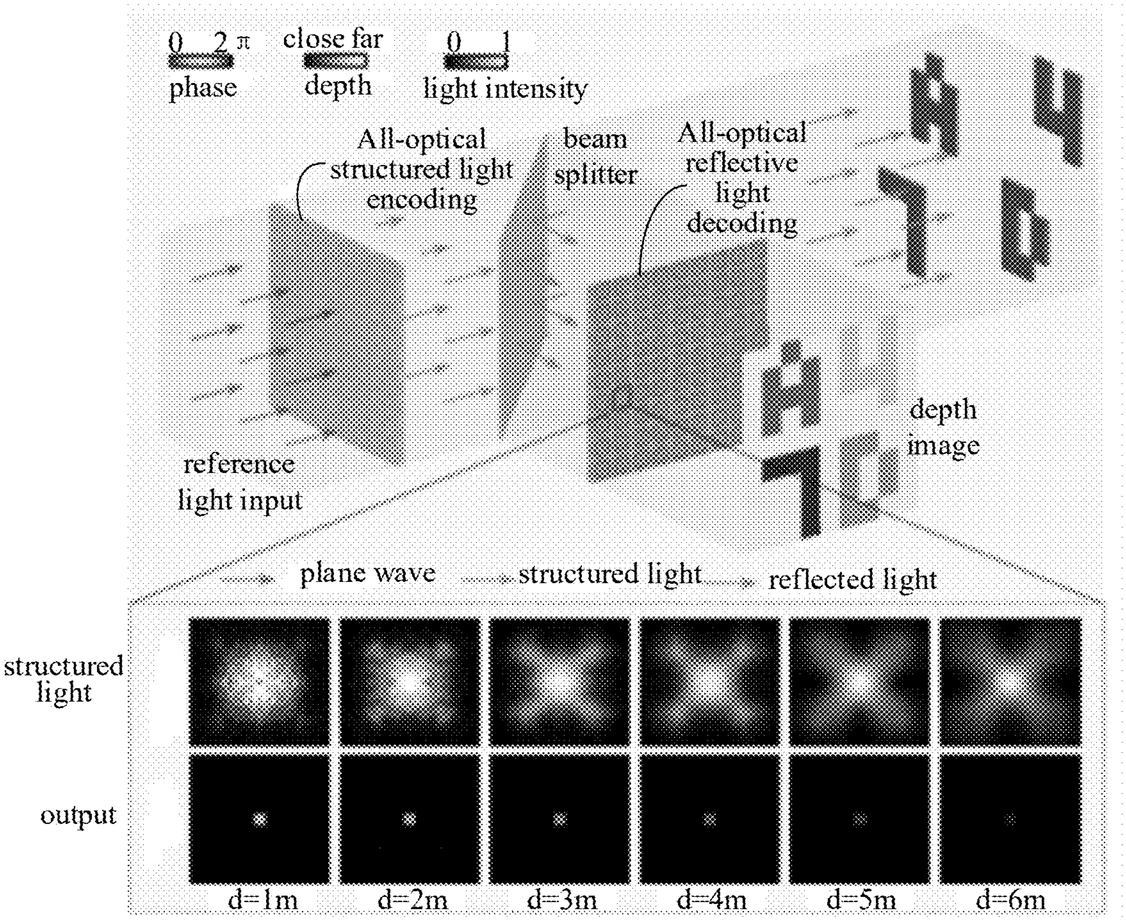
FIG. 2 is a diagram of an optical structure of the all-optical intelligent computing three-dimensional perception system according to an embodiment of the present disclosure.

FIG. 2 is a diagram of an optical structure of the all-optical intelligent computing three-dimensional perception system. The reference light inputting module generates the laser beam by the solid state laser with the working wavelength to provide the system working light source. The all-optical structured light encoding module is accomplished by modulating the wave-front phase using the encoding diffractive surface consists of the phase modulator with the encoding phase modulation information, to generate the structured light with the spatial pattern varying with depth. The structured light illuminating module is accomplished by the beam splitters and other optical elements to irradiate the generated structured light onto the surface of the object. The all-optical reflected light decoding module is accomplished by the decoding diffractive surface consists of the phase modulator with the decoding phase modulation information, to map the depth information in the structured light reflected by the object to the light intensity of the output plane. The light intensity of the output plane directly reflects the depth image, and the three-dimensional information acquisition module obtains the light intensity information on the output plane captured by the photodetector, to realize the depth information acquisition and complete the three-dimensional perception.

The all-optical intelligent computing three-dimensional perception system enables light-speed and post-processing-free three-dimensional perception via diffractive surfaces. The present disclosure works by encoding depth information into the spatial pattern of custom structured light and decoding it into an output light intensity through optical interconnections optimized by the diffractive surfaces. Unlike a use of reconstruction algorithms, a three-dimensional map are immediately recorded using 2D sensors and a captured light intensity directly represents the depth information.

Figure 3:
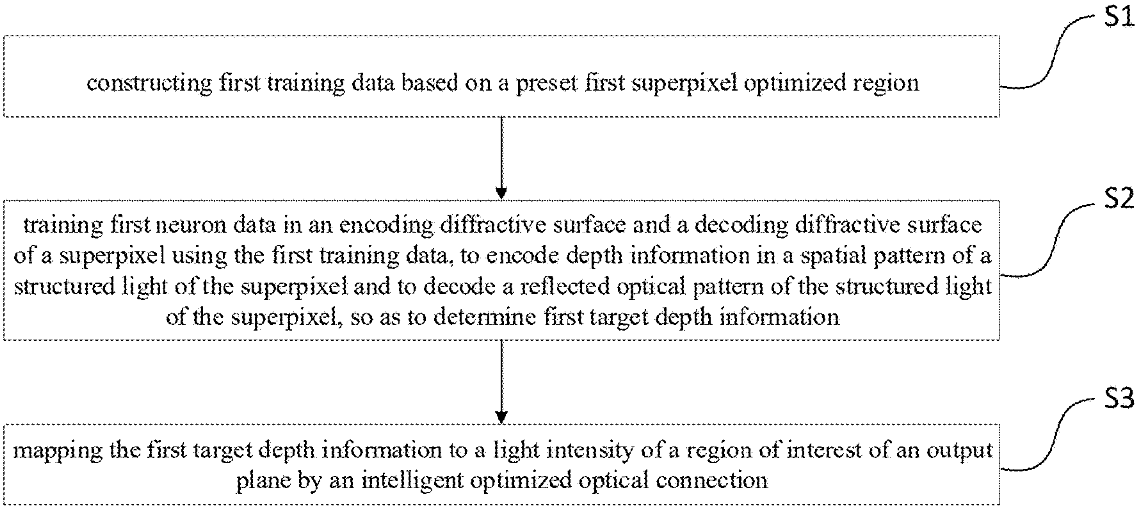
FIG. 3 is a flowchart of a method applied to the all-optical intelligent computing three-dimensional perception system according to an embodiment of the present disclosure.

FIG. 3 is a flowchart of an optical superpixel modeling and training method for three-dimensional perception of arbitrarily shaped objects according to an embodiment of the present disclosure. The method includes the following steps.

At step S1, first training data is constructed based on a preset first superpixel optimized region.

At step S2, first neuron data in an encoding diffractive surface and a decoding diffractive surface of a superpixel is trained using the first training data, to determine first target depth information according to depth information in a spatial pattern of a structured light of an encoding superpixel and a reflected optical pattern of the structured light of a decoding superpixel.

At S3, the first target depth information is mapped to a light intensity of a ROI of an output plane by an intelligently optimized optical connection.

In detail, in the method of the embodiment of the present disclosure, a square region with a suitable size is selected as a superpixel optimized region on which a suitable training set, a test set and a suitable loss function are established. The amplitude and phase modulation coefficients of each neuron in the superpixel intelligent diffractive surface are trained in combination with an error back propagation and a stochastic gradient descent algorithm, to realize that an encoding superpixel generates a customized structured light and a decoding superpixel learns the depth information in the spatial pattern. The depth information is linearly mapped to the light intensity of the ROI of the output plane through the intelligently optimized optical connection. Preferably, the training requires that the structured light of the encoding superpixel is confined within a superpixel region and an output of the decoding superpixel is also confined within a superpixel region to prevent crosstalk between neighboring superpixels. After a single encoding superpixel and a single decoding superpixel are optimized, they are replicated at any integer multiple and spliced together to form an encoding intelligent diffractive surface and a decoding intelligent diffractive surface.

In an embodiment of the present disclosure, the first training data includes the training set, the test set, and the loss function, and the first neuron data includes the amplitude modulation coefficient and includes phase modulation coefficient of neuron.

Figure 4:
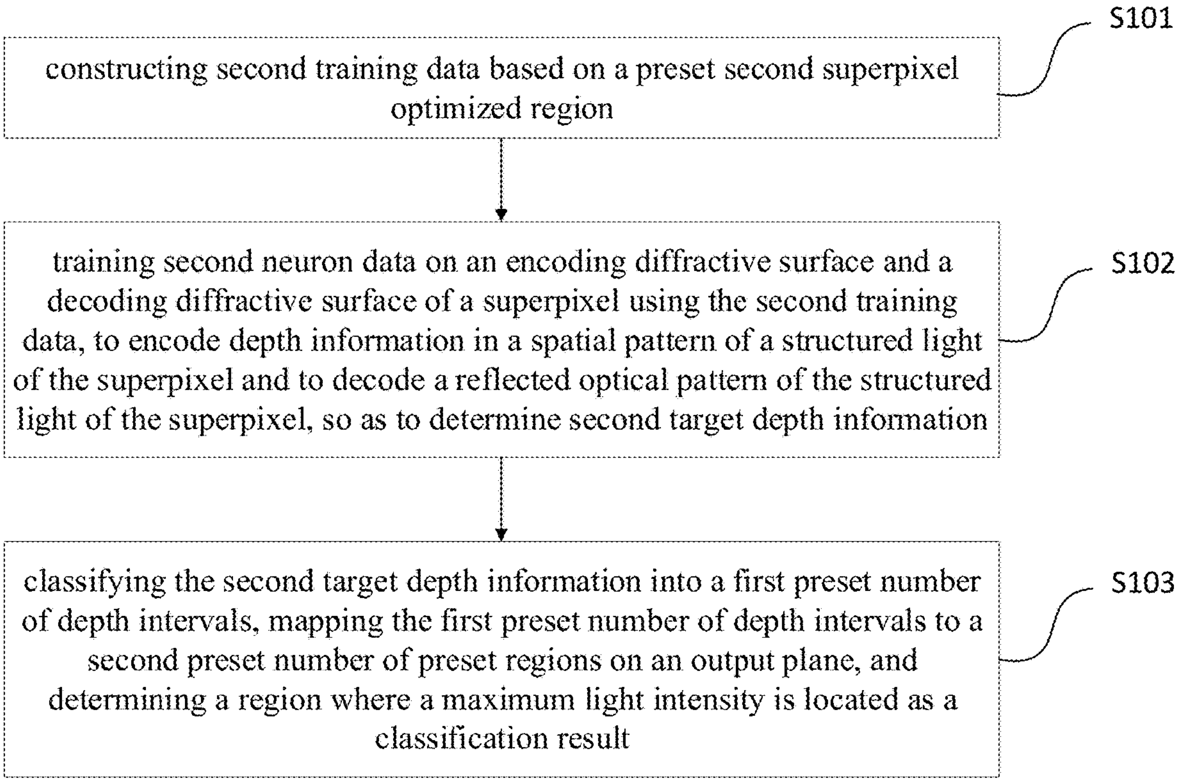
FIG. 4 is a flowchart of another method applied to the all-optical intelligent computing three-dimensional perception system according to an embodiment of the present disclosure.

FIG. 4 is a flowchart of a superpixel classification modeling and training method for robust three-dimensional perception of arbitrarily shaped objects under different illumination and reflectivity conditions according to an embodiment of the present disclosure. The method includes the following steps.

At step S101, second training data is constructed based on a preset second superpixel optimized region.

At step S102, second neuron data in an encoding diffractive surface and a decoding diffractive surface of a superpixel is trained using the second training data, to determine second target depth information according to depth information in a spatial pattern of a structured light of an encoding superpixel and a reflected optical pattern of the structured light of a decoding superpixel.

At step S103, the second target depth information is classified into a first preset number of depth intervals, and the first preset number of depth intervals are mapped to a second preset number of preset regions on an output plane, to determining a region where a maximum light intensity is located as a classification result.

In detail, in the embodiment of the present disclosure, a square region with a suitable size is selected as a superpixel optimized region on which a suitable training set, a test set and a suitable loss function are established. Amplitude and phase modulation coefficients of each neuron in a superpixel intelligent diffractive surface are trained in combination with an error back propagation and a stochastic gradient descent algorithm, to realize that an encoding superpixel generates a customized structured light and a decoding superpixel learns the depth information in the spatial pattern of a reflected structured light. Target depth information is divided into a specific number of depth intervals. The trained superpixel maps the depth intervals to a specific number of predefined regions on the output plane. The region where the maximum light intensity is located is determined as the classification result and represents quantization depth. After a single encoding superpixel and a decoding superpixel are optimized, they are replicated at any integer multiple and spliced together to form the encoding intelligent diffractive surface and the decoding intelligent diffractive surface.

In an embodiment of the present disclosure, the second training data includes the training set, the test set, and the loss function, and the second neuron data includes the amplitude modulation coefficient and includes phase modulation coefficient of neuron.

Figure 5:
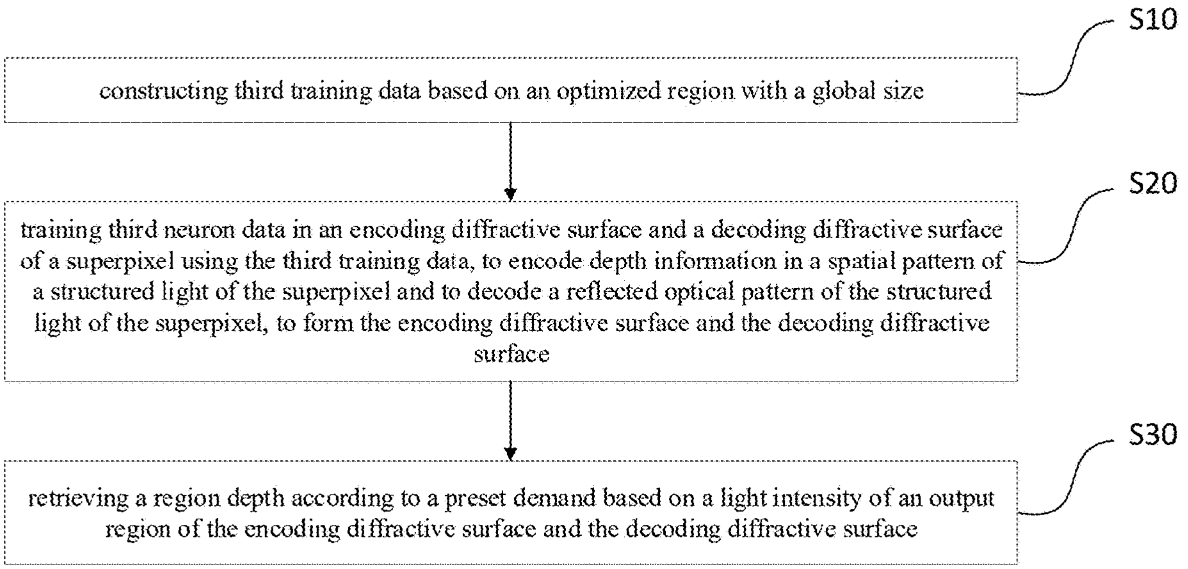
FIG. 5 is a flowchart of another method applied to the all-optical intelligent computing three-dimensional perception system according to an embodiment of the present disclosure.

FIG. 5 is a flowchart of an optical global modeling and training method for objects with priori shape information according to an embodiment of the present disclosure. The method includes the following steps.

At step S10, third training data is constructed based on an optimized region with a global size.

At step S20, third neuron data in an encoding diffractive surface and a decoding diffractive surface of a superpixel is trained using the third training data, to form the encoding diffractive surface and the decoding diffractive surface according to depth information in a spatial pattern of a structured light of an encoding superpixel and a reflected optical pattern of the structured light of a decoding superpixel.

At step S30, a region depth is retrieved according to a preset demand based on a light intensity of output regions of the encoding diffractive surface and the decoding diffractive surface.

In detail, in the embodiment of the present disclosure, a region with a global size is selected as an optimized region on which a suitable training set having priori shape information, a test set and a suitable loss function are established. Amplitude and phase modulation coefficients of each neuron in an intelligent diffractive surface are trained in combination with an error back propagation and a stochastic gradient descent algorithm, to realize that an encoding superpixel generates a customized structured light and a decoding superpixel learns the depth information in the spatial pattern of a reflected structured light, so as to generate the encoding intelligent diffractive surface and the decoding intelligent diffractive surface. The region depth can be retrieved according to a demand by a light intensity of an output region or a location of the maximum light intensity of the output region.

In an embodiment of the present disclosure, the third training data includes the training set, the test set, and the loss function, and the third neuron data includes the amplitude modulation coefficient and includes phase modulation coefficient of neuron.

It is understood that the intelligent diffractive surface consists of a phase modulator. The phase modulator may be realized by using a SLM or a phase plate made of a specific material. The phase modulator can determine the amplitude modulation coefficient and the phase modulation coefficient of each pixel for a light, and each pixel is an optical neuron. The intelligent diffractive surfaces form a neural network with a specific function through free space propagation, to realize tasks such as intelligent computation and feature learning.

Figure 6A:
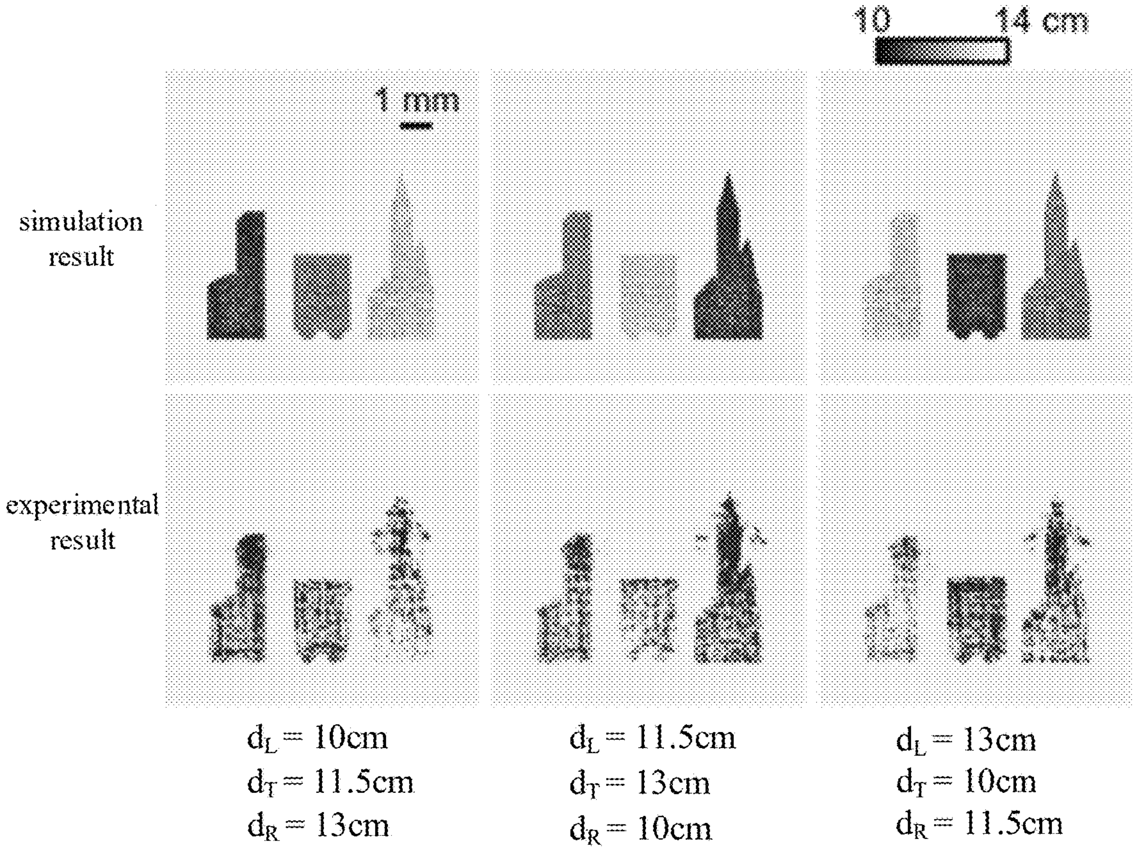
FIG. 6A is a schematic diagram of simulation and experimental outputs for objects with priori shape information according to an embodiment of the present disclosure.
Figure 6B:
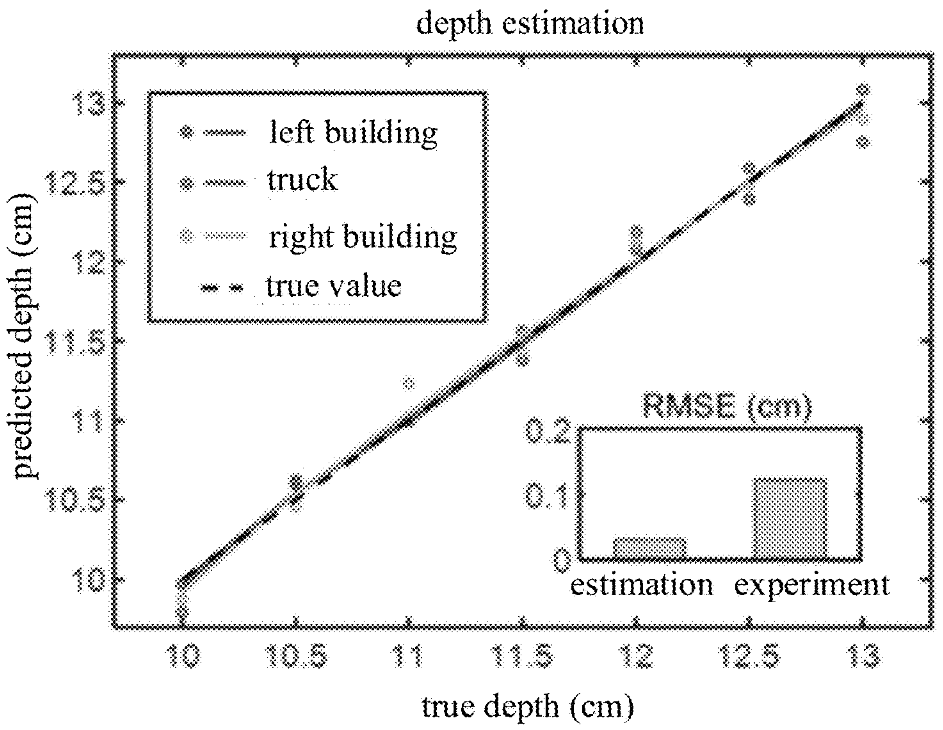
FIG. 6B is a schematic diagram of a depth detection result for objects with priori shape information according to an embodiment of the present disclosure.

FIG. 6A illustrates simulation and experimental outputs for objects with priori shape information realized according to FIGS. 1 and 2. FIG. 6B is a schematic diagram of a depth detection result for objects with priori shape information realized according to FIGS. 1 and 2.

Figure 7A:
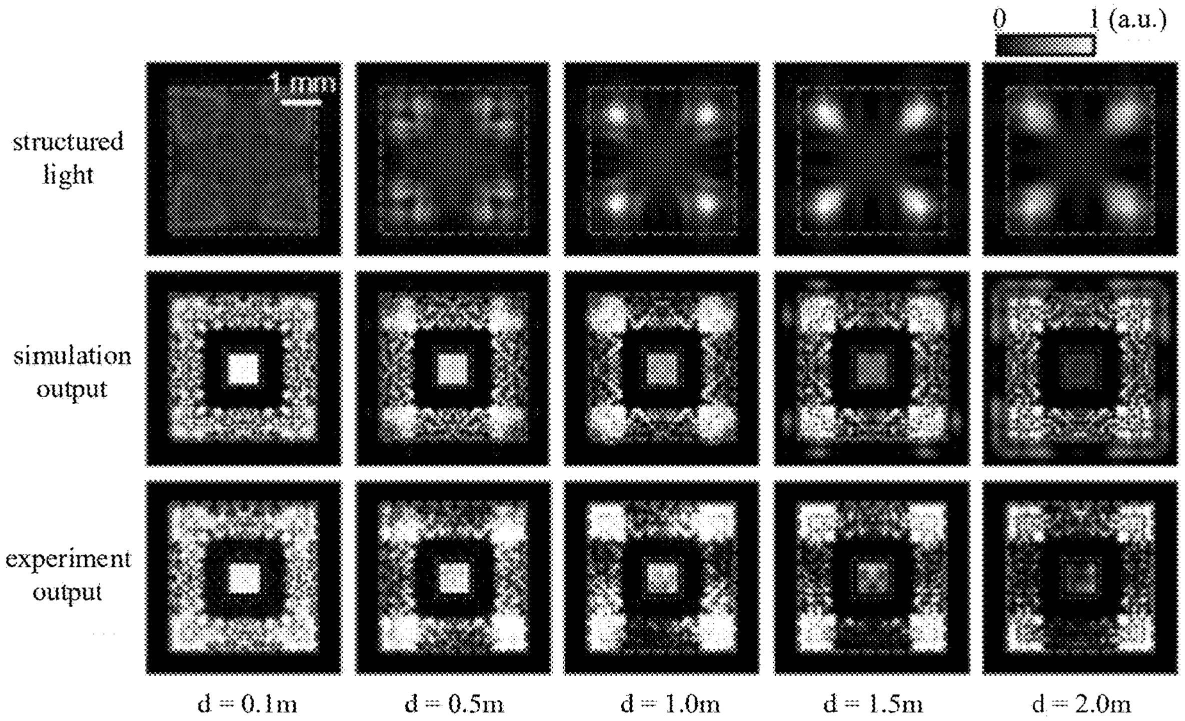
FIG. 7A is a schematic diagram of output results of a single-group of superpixels at different depths according to an embodiment of the present disclosure.
Figure 7B:
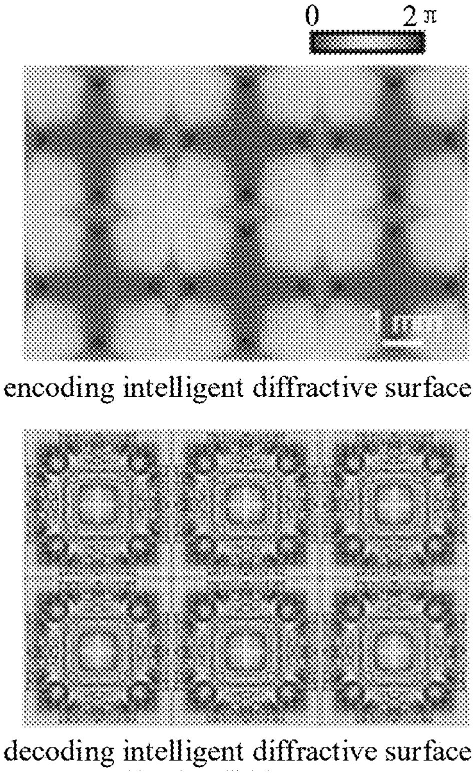
FIG. 7B is a schematic diagrams of an encoding intelligent diffractive surface and a decoding intelligent diffractive surface obtained by replicating superpixels according to an optical superpixel depth detection output result according to an embodiment of the present disclosure.
Figure 7C:
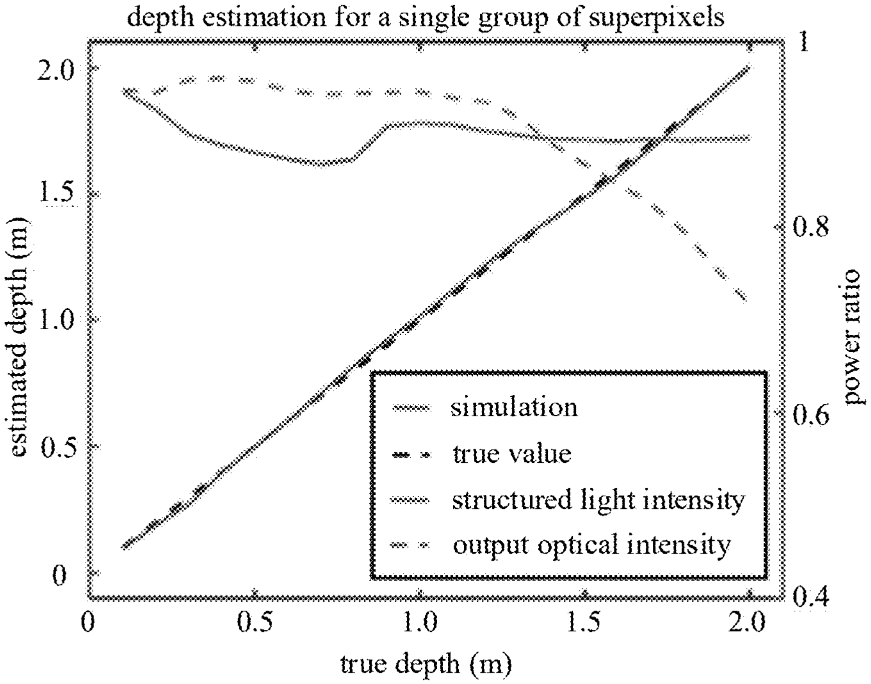
FIG. 7C is a comparison diagram of depth estimation results of a single-group of superpixels according to an embodiment of the present disclosure.
Figure 7D:
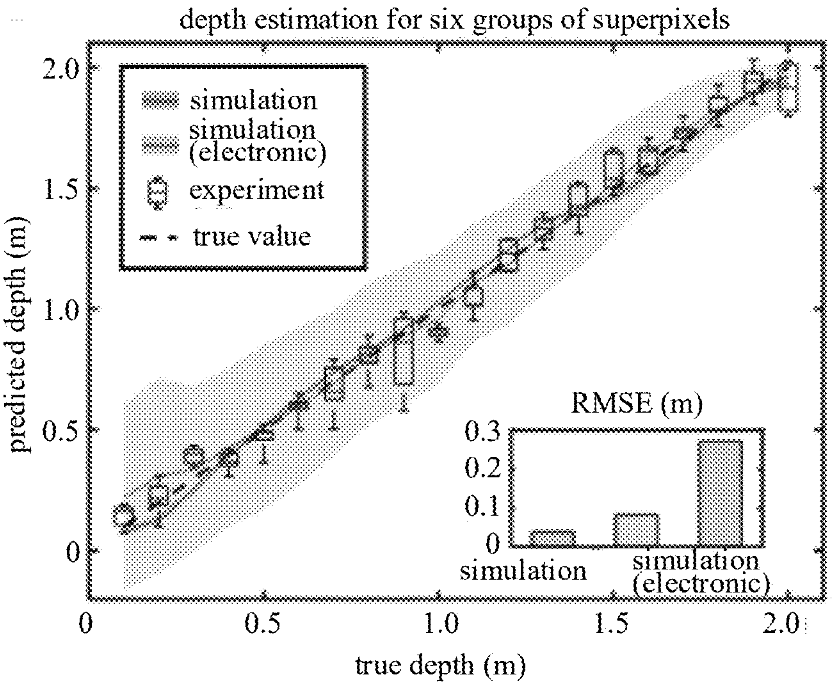
FIG. 7D is a comparison diagram of depth estimation results of six groups of superpixels according to an embodiment of the present disclosure.
Figure 7E:
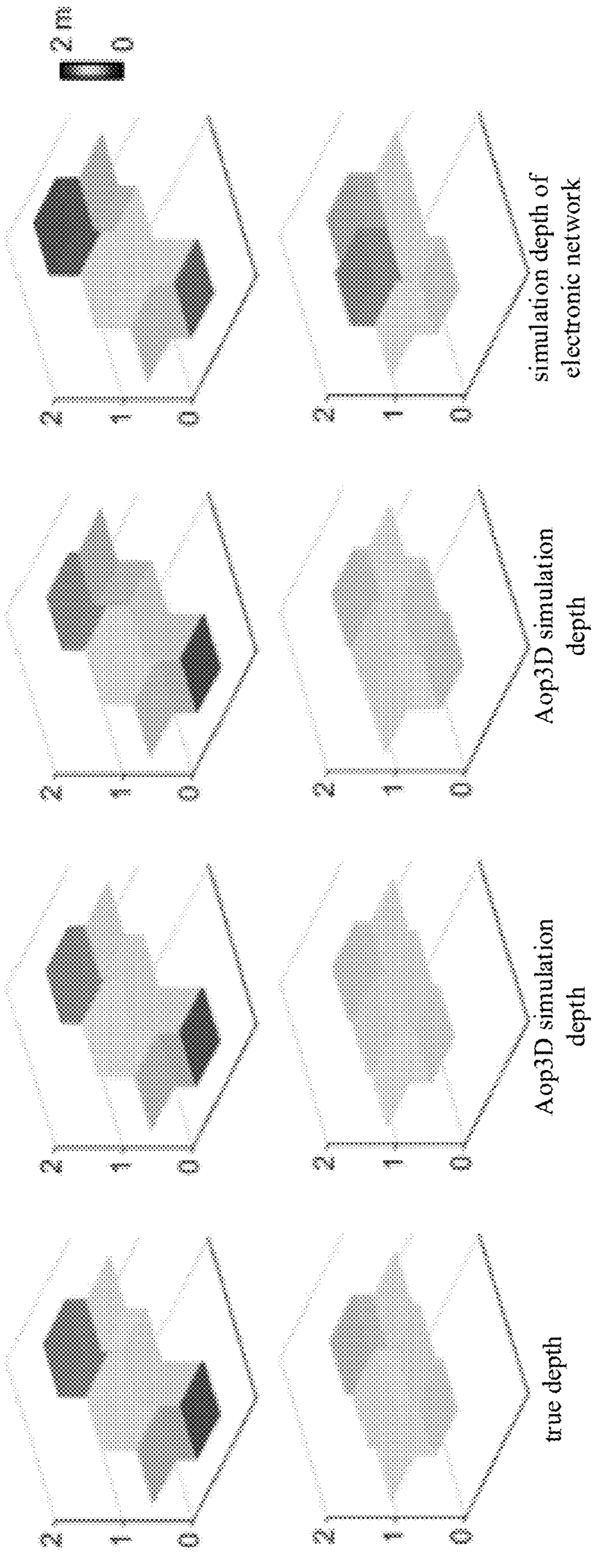
FIG. 7E is a comparison diagram of a superpixel depth estimation result and an electronic network depth estimation result according to an embodiment of the present disclosure.

FIGS. 7A to 7E illustrates output results of optical superpixel depth detections of three-dimensional perception for arbitrarily shaped objects realized according to FIGS. 1 and 2, diagrams of encoding intelligent diffractive surfaces and decoding intelligent diffractive surfaces obtained by replicating superpixel, and depth estimation results for single-group and multi-group superpixels and a comparison diagram of a superpixel depth estimation result and an electronic network depth estimation result. FIG. 7A illustrates the output results of a single-group of superpixels at different depths. Light propagation is confined to a metapixel region, therefore ensuring limited crosstalk after replication. When facing a general object (taking six steps as an example), all-in-one perception three-dimensional (Aop3D) can directly perform a depth detection by modulating light propagation. When an electronic network faces a same task, different diffractive images are generated for different combinations of depths, which results in an exponential growth of size of the training set as the increase of the number of steps, therefore causing the electronic network to be severely interfered. FIGS. 7D-E demonstrate the advantages of an optical superpixel depth detection over the electronic network in detecting arbitrary objects (taking six steps as an example).

Figure 8A:
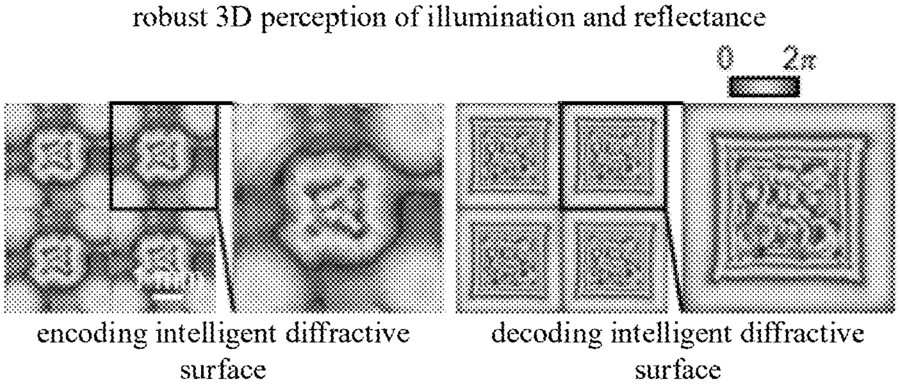
FIG. 8A is a diagram of output results of superpixel classification for achieving robust 3D perception of arbitrary shaped objects under different illumination and reflectivity conditions, as well as the schematic diagrams of an encoding intelligent diffraction surfaces and a decoding intelligent diffraction surfaces obtained by superpixel replication according to an embodiment of the present disclosure.

FIG. 8A illustrates the superpixel classification detection output results for robust three-dimensional perception for arbitrarily shaped objects under different illumination and reflectivity conditions realized according to FIGS. 1 and 2, which demonstrates the robustness of the system.

Figure 9A:
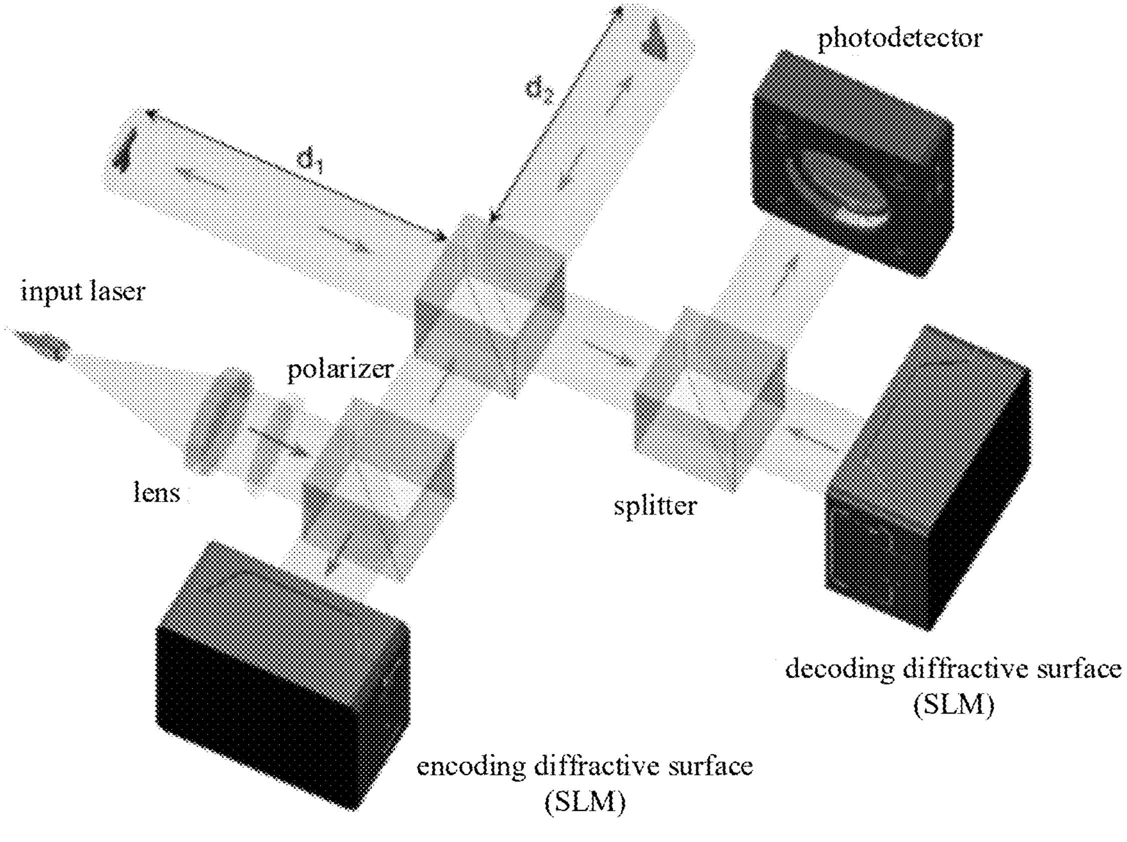
FIG. 9A is a schematic diagram of a system when using a SLM as an intelligent diffractive surface according to an embodiment of the present disclosure.
Figure 9B:
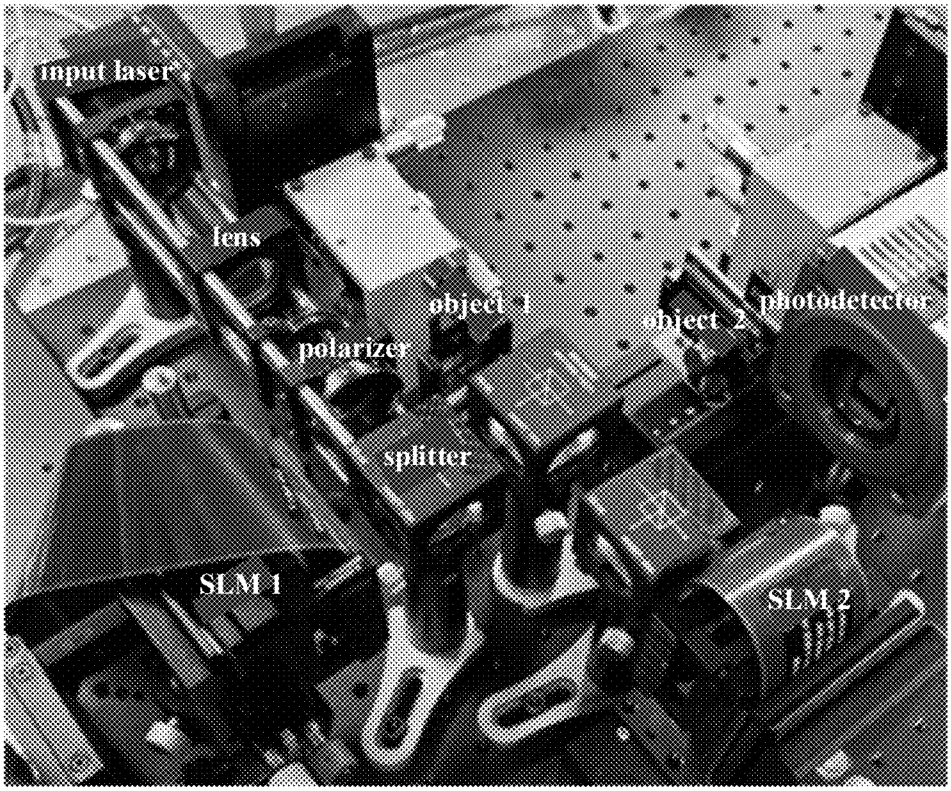
FIG. 9B is a schematic diagram of an experimental system when using a SLM as an intelligent diffractive surface according to an embodiment of the present disclosure.

FIGS. 9A and 9B illustrate a schematic diagram of a system and a schematic diagram of an experimental system when using a SLM as an intelligent diffractive surface realized according to FIGS. 1, 2, 6A and 6B. The laser beam is generated using a solid state laser (MRL-FN-698, CNI) with a working wavelength of 698 nm. It is coupled to a single-mode fiber (P5-630A-PCAPC-1, Thorlabs), collimated via a lens (AC254-100-A, Thorlabs) and polarized by a linear polarizer (LPNIR100, Thorlabs), to achieve the reference light inputting module 111. The first SLM (P1920-400-800 Meadowlark) modulates the wave-front phase and generates the structured light according to an optimized coding mask, and provides the depth information encoded into the spatial pattern of the customized structured light, to realize the all-optical structured light encoding module 112. The structured light is split by a beam splitter (CCM1-BS013, Thorlabs) to illuminate two objects, and a reflected light from an object to be measured is provided to a decoding diffraction computing unit, to achieve the structured light illuminating module 113. The reflected light from the objects is perceived by a second SLM (HSP1920-600-1300-HSP8, Meadowlark) to decode the depth information and map it into the light intensity after a distance of 12 cm, to achieve the all-optical reflected light decoding module 114. After diffraction propagation for 12 cm, depth images are captured by using a scientific complementary metal oxide semiconductor (sCMOS) sensor (Andor Zyla 4.2), which accomplishes a depth detection.

Figure 10A:
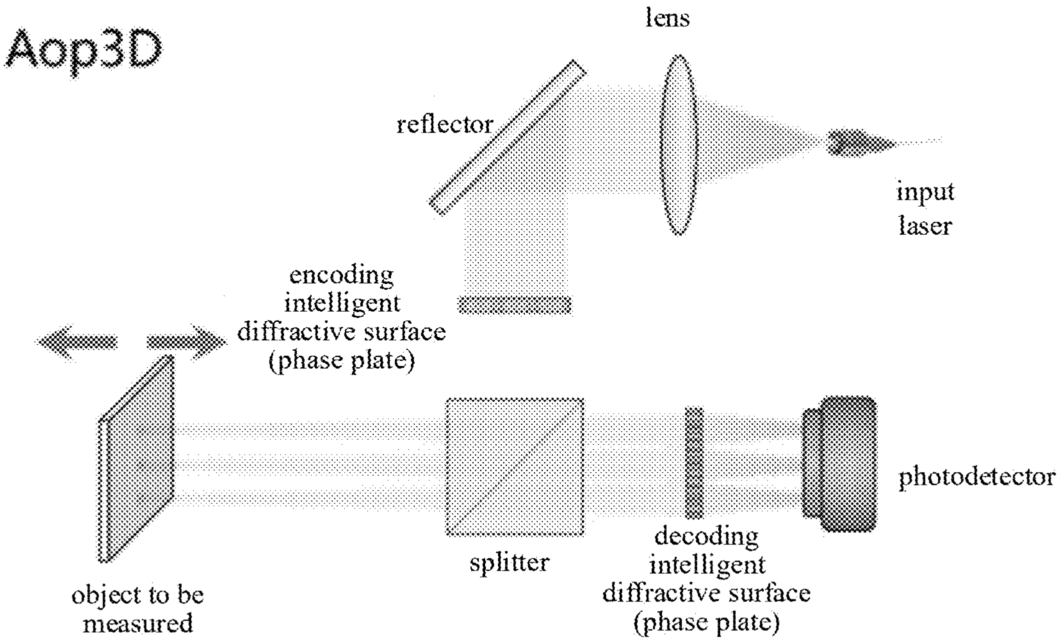
FIG. 10A is a schematic diagram of a system when using a phase plate as an intelligent diffractive surface according to an embodiment of the present disclosure.
Figure 10B:
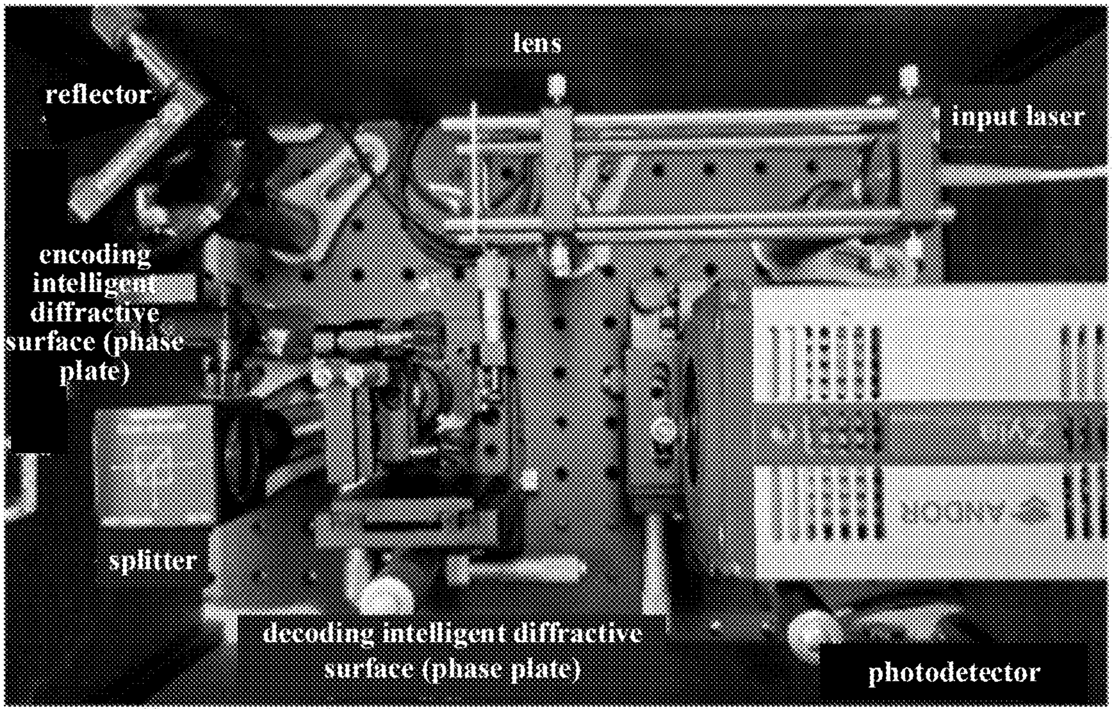
FIG. 10B is a schematic diagram of an experimental system when using a phase plate as an intelligent diffractive surface according to an embodiment of the present disclosure.

FIGS. 10A and 10B illustrate a schematic diagram of a system and a schematic diagram of an experimental system when using a phase plate as an intelligent diffractive surface realized according to FIGS. 1, 2 and 7A-7E.

Figure 11A:
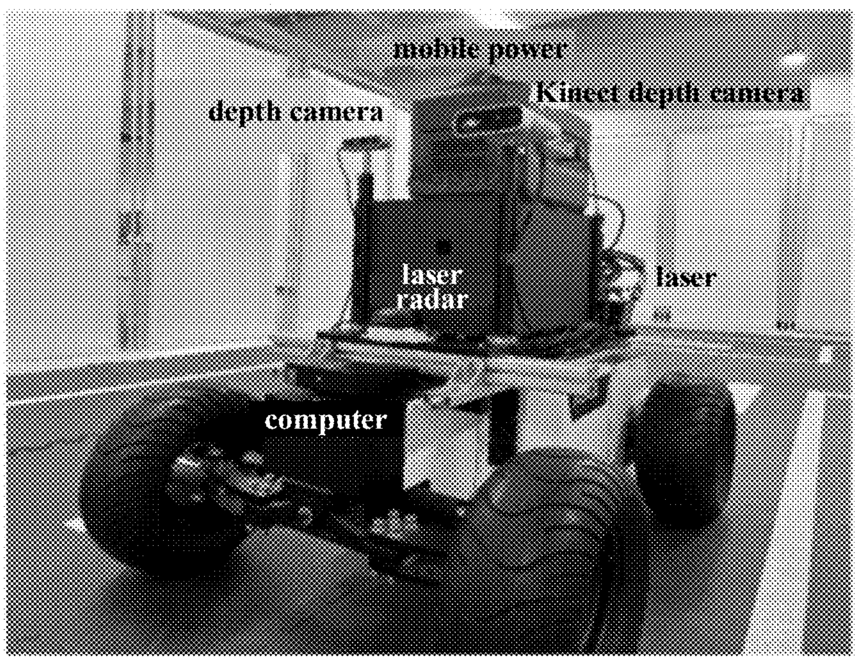
FIG. 11A to 11D are a comparison graph of a result of performing all-optical obstacle avoidance in a realistic scenario and results of other sensors according to an embodiment of the present disclosure.
Figure 11B:
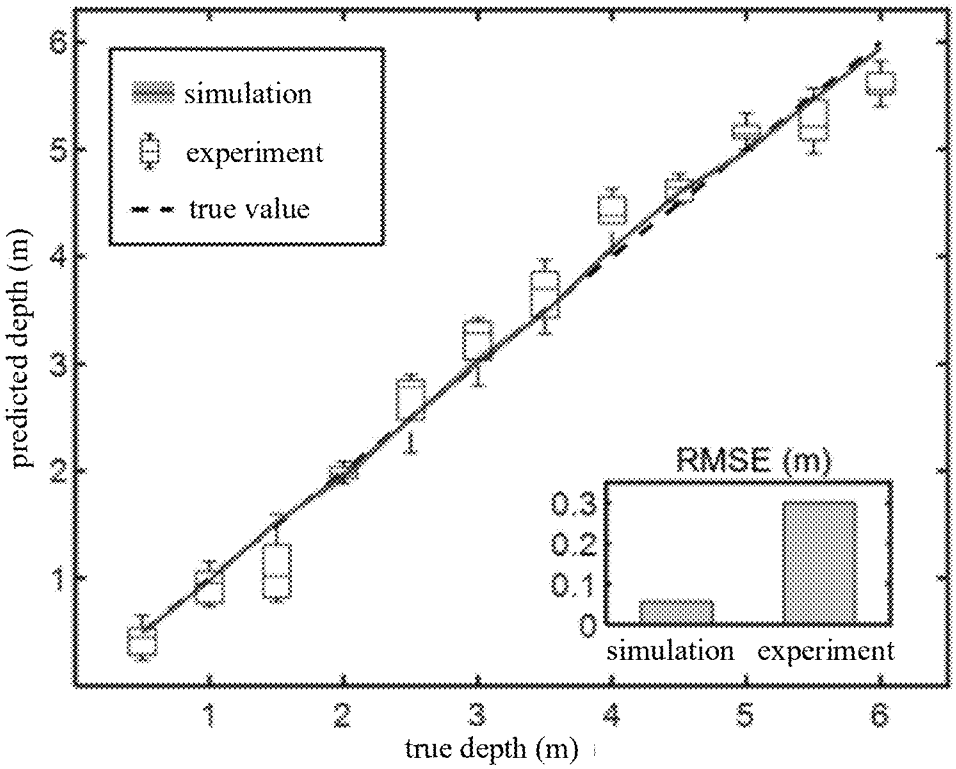
Figure 11C:
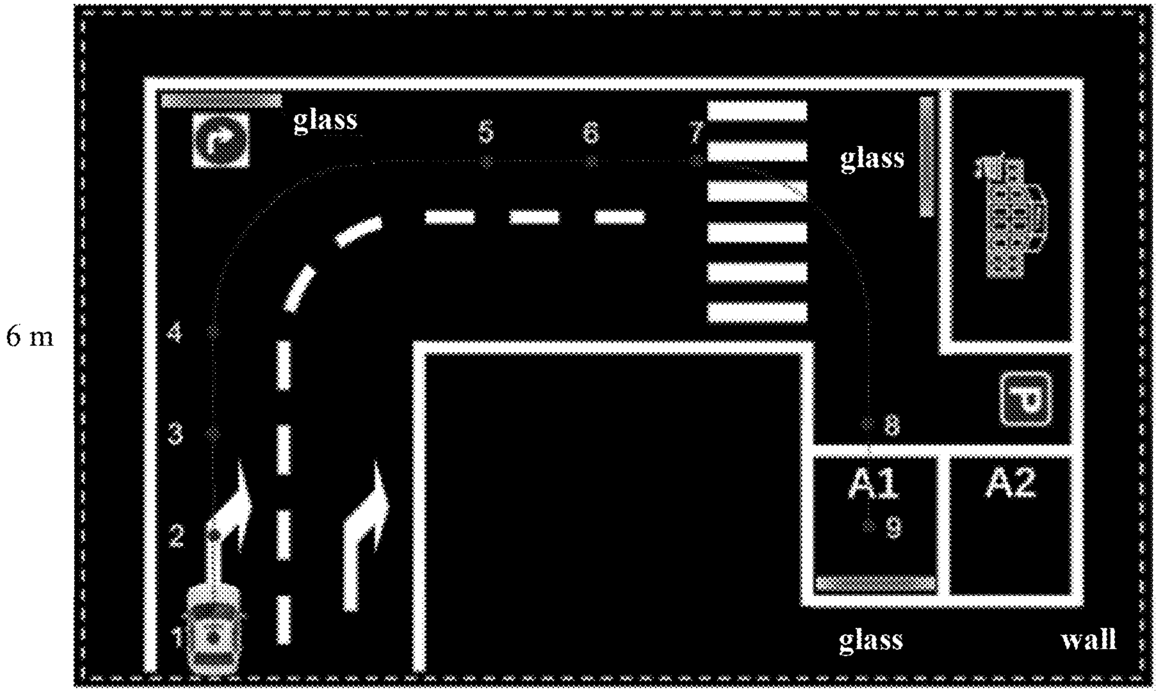
Figure 11D:
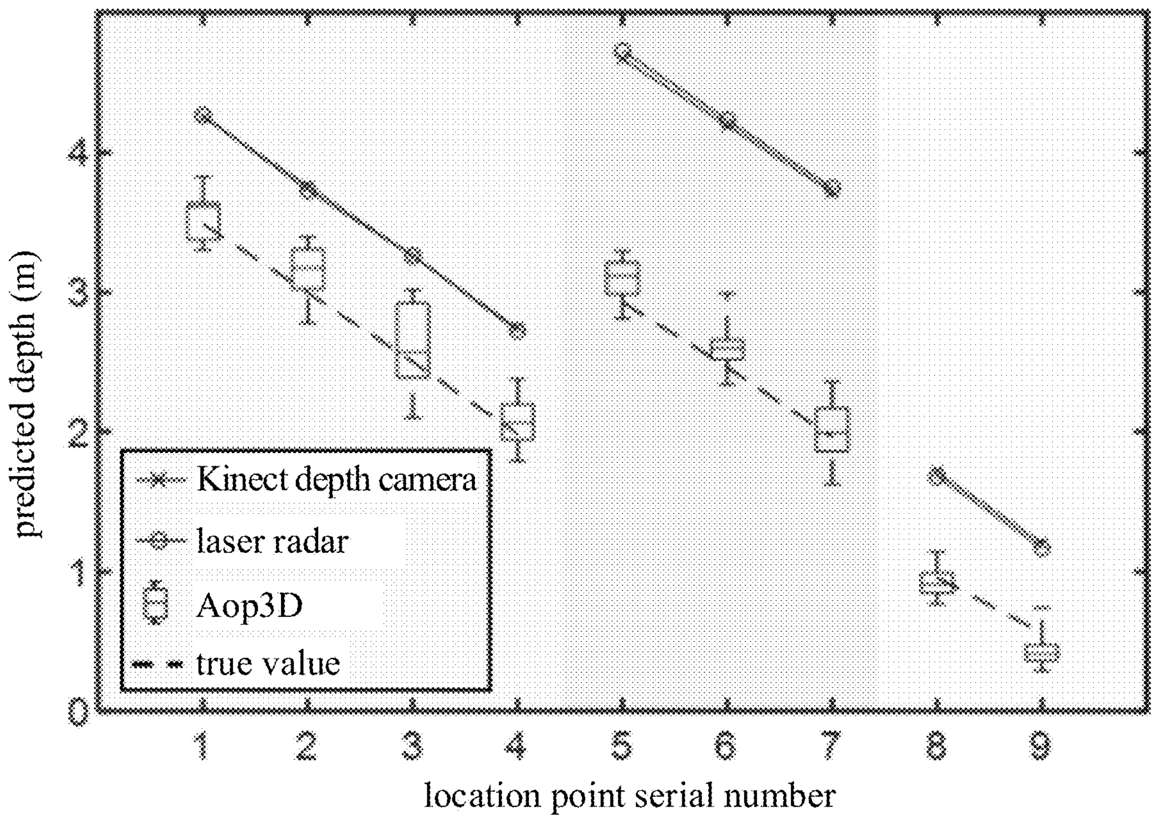

FIGS. 11A to 11D illustrate a comparison graph of a result of performing all-optical obstacle avoidance in a realistic scenario and results of other sensors (including a Kinect depth camera and a LiDAR). FIG. 11D illustrates that a car successfully detects all pieces of glass and obtains correct distances using Aop3D. However, the Kinect depth camera and LiDAR are unable to detect the pieces of glass and incorrectly return distances to walls, which are always greater than distances to the pieces of glass, results in collision risks.

To ensure that the light intensity of an output optical field O is linearly correlated with depth, the phase modulation parameters of the encoding and decoding surfaces of the present disclosure are optimized. In the present disclosure, for the solution of the three-dimensional perception for objects with priori shape information, a mean square error (MSE) between $|O|^2$ and a true depth image $O^{gt}$ is used as the loss function:

$$\mathrm{Loss}_1(O, O^{gt}) = \frac{1}{N^2}\sum_{i,j}\left(O^{gt}_{i,j} - a|O_{i,j}|^2\right)^2 \tag{1}$$

where, α is a trainable parameter and is used to adjust a magnification of a light intensity, i and j are image pixel indexes, and N is a number of pixels in a row or column of an image.

In FIGS. 7A-7E, a solution for performing the three-dimensional perception for arbitrarily shaped objects using a superpixel is provided. A system goal is to optimize a superpixel to achieve a linear relationship between an average light intensity of an output RoI and the depth. For depth d in a range of $[d_{min}, d_{max}]$, a true output $O^{gt}$ is designed as:

$$O^{gt}_{i,j} = \begin{cases} \frac{d_{max} - d}{d_{max} - d_{min}}, & (i, j) \in RoI \\ 0, & \text{Others} \end{cases} \quad (2)$$

Figure 8B:
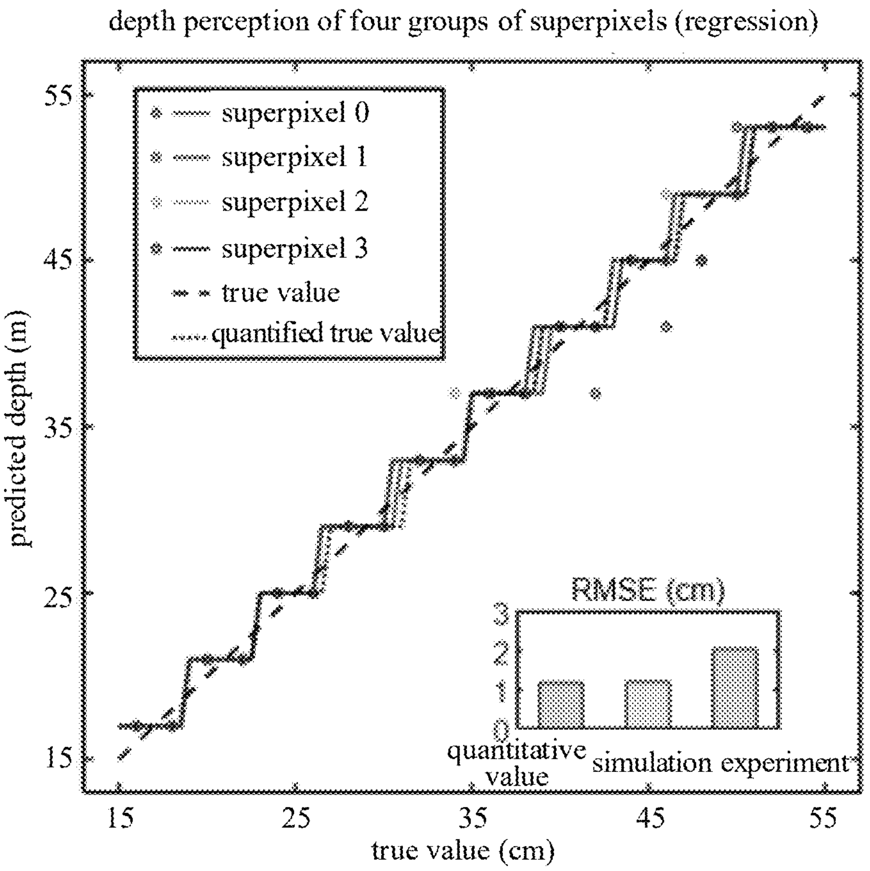
FIG. 8B is a diagram of depth estimation results of four groups of superpixels according to an embodiment of the present disclosure.
Figure 8C:
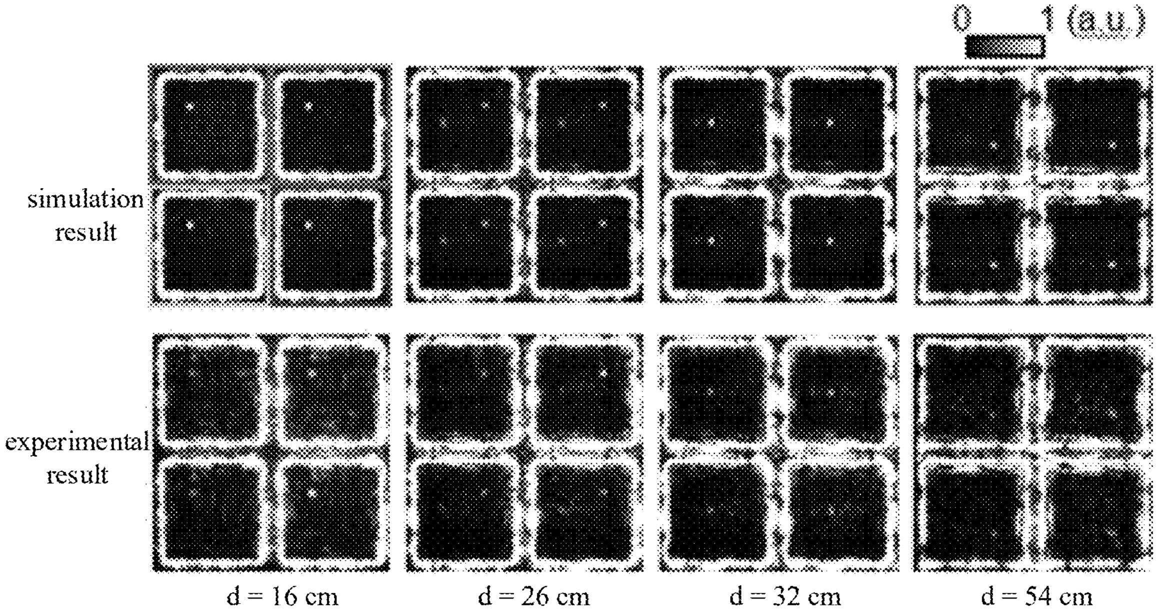
FIG. 8C is a comparison between depth estimation results of multi-group of superpixel simulations and experiments and quantized value results according to an embodiment of the present disclosure.

In FIGS. 8A-8C, a superpixel classification solution for a robust three-dimensional perception for arbitrarily shaped objects under different illumination and reflectivity conditions is provided, where the location of light aggregation represents the depth information:

$$O^{gt}_{i,j} = \begin{cases} 1, & (i, j) \in \text{Predefined Classification Region} \\ 0, & \text{Others} \end{cases} \quad (3)$$

The present disclosure highlights a central region of the output field O for depth estimation. A width and height of the central region is half of that of the metapixel (i.e., 75% in the classification solution) and is denoted as RoI2, and a remaining region is used for light propagation. The loss function is defined as:

$$\text{Loss}_{depth}(O, O^{gt}) = \frac{1}{N^2_{RoI2}} \sum_{i,j}^{(i,j)\in RoI2} \left(O^{gt}_{i,j} - a|O_{i,j}|^2\right)^2 \quad (4)$$

where, $\alpha$ is a trainable parameter and is used to adjust a magnification of the light intensity, and $N_{RoI2}$ is a number of pixels in a row or column of the RoI2. In order to limit light propagation with a metapixel region (denoted as RoI3), the loss function is defined as:

$$\text{Loss}_{power}(O) = -\log \frac{\sum_{i,j}^{(i,j)\in RoI3} |O_{i,j}|^2}{\sum |O_{i,j}|^2} \quad (5)$$

A two-stage scheme is used, i.e., O and structured light SL are constrainted simultaneously:

$$SL = P_d\{t_{en} \cdot I\} \quad (7)$$

where, $P_d$ is an operator for a free-space diffraction propagation distance d, $t_{en}$ is a transmission function of the encoding diffractive surface, and I is an incident light.

Therefore, a total loss function is:

$$\text{Loss}_2 = \lambda_1 \text{Loss}_{depth}(O, O^{gt}) + \lambda_2 \text{Loss}_{power}(O) + \lambda_3 \text{Loss}_{power}(SL) \quad (10)$$

where $\lambda_1$, $\lambda_2$ and $\lambda_3$ are weights, and a sum of $\lambda_1$, $\lambda_2$ and $\lambda_3$ is 1. Therefore, in examples of the present disclosure, a superpixel optimization method is used when facing the three-dimensional perception for arbitrarily shaped objects in a general scene. The superpixel optimization method involves selecting a square region with a suitable size as a depth perceiving unit, training the phase modulation parameters of the encoding and decoding superpixels by the error back propagation algorithm to limit the propagation of the structured light generated by the encoding superpixel to the superpixel region, and to limit the output of the decoding superpixel to the superpixel region simultaneously, to prevent crosstalk between neighboring superpixels. Meanwhile, the decoding superpixel linearly maps the depth information to the light intensity of the ROI of the output plane via the intelligently optimized optical connection. After a single encoding superpixel and a single decoding superpixel are optimized, they are replicated at any integer multiple and spliced together to form the encoding intelligent diffractive surface and the decoding intelligent diffractive surface. In the examples of the present disclosure, the superpixel classification method is used when facing the three-dimensional perception for arbitrarily shaped objects under different illumination and reflectivity conditions. The target depth range is divided into a specific number of depth intervals. The trained superpixel maps the depth intervals to a number of predefined regions on the output plane. The region where the maximum light intensity is located is determined as the classification result and represents the quantization depth. Similarly, structured light propagation is constrained within each superpixel region. A single superpixel is replicated and spliced to form the encoding intelligent diffractive surface and the decoding intelligent diffractive surface. The global optimization method is used when facing a scenario with priori shape information. The global optimization method takes an entire diffractive surface as an optimization object, and trains the phase modulation parameters of the intelligent diffractive surface by the error back propagation algorithm, to optically map the depth information of the entire scenario to the light intensity of the output plane. In the present disclosure, the FoV can be increased by horizontally expanding the encoding and decoding diffractive surfaces, and the three-dimensional perception performance can also be enhanced by vertically stacking the number of diffractive surface layers.

In conclusion, in the present disclosure, the method is distinguished from the method using ToF or FMCW in the LiDAR solutions. The method works by encoding the depth information into the spatial pattern of the customized structured light and decoding it into the output light intensity by the optical interconnection optimized by diffractive surfaces. Different from the reconstruction algorithms, three-dimensional maps are immediately recorded using two-dimensional sensors, and the depth information is directly represented through the captured light intensity.

In the present disclosure, a customized superpixel model is developed, and is independently manipulates light propagation in each superpixel to achieve three-dimensional perception for arbitrary shaped objects. The encoding and decoding surfaces are co-optimized by deep learning, to achieve best three-dimensional perception performance. The diffractive surfaces are produced by simple three-dimensional printing or lithography, and are assembled into a three-dimensional imager. The present disclosure can be flexibly designed for different depth ranges. The encoding and decoding surfaces can be cascaded horizontally for larger FoV and can be stacked vertically for better performance. Based on this scalable architecture, the present disclosure has been successfully applied in a variety of scenarios, including high-resolution three-dimensional perception scenarios with priori knowledge, three-dimensional perception for arbitrarily shaped objects, robust three-dimensional perception under different illumination and reflection conditions, and all-optical obstacle avoidance in actual automatic driving tasks. In the present disclosure, by accomplishing three-dimensional perception using passive diffractive surfaces and consuming no energy other than optical power, the computational load are reduced and a light-speed and power-efficient solution is provided for depth perception. In the present disclosure, the device is able to work with a speed of 600 Hz (limited by a camera frame rate) and a power of 0.3 μW. Compared with typical 30 Hz and watt-level power in conventional methods, a 20 times improvement in speed and a 6 orders of magnitude improvement in energy efficiency are achieved in the present disclosure.

In conclusion, an all-optical neural network system for depth detection is established in the present disclosure, which exhibits excellent performance over electronic networks with the same amount of parameters (taking U-Net structure as an example). The method and device in the present disclosure works well at long distances (up to 6 meters), a low power (as low as 0.3 μW), a high speed (up to 600 Hz), and a high transmittance, proving its performance advantages over traditional depth perception methods such as the LiDAR.

The method based on the all-optical intelligent computing three-dimensional perception system in the present disclosure enables light-speed and post-processing-free three-dimensional perception via diffractive surfaces. The present disclosure works by the encoding depth information into the spatial pattern of customized structured light and decoding it into the output light intensity through optical interconnections optimized by diffractive surfaces. Unlike the reconstruction algorithms, three-dimensional maps are immediately recorded using two-dimensional sensors, and the captured light intensity directly represents the depth information. The present disclosure proposes a new idea of three-dimensional perception, which greatly simplifies the three-dimensional perception process and supports the next generation of high-speed, low-power three-dimensional perception technology.

Figure 12:
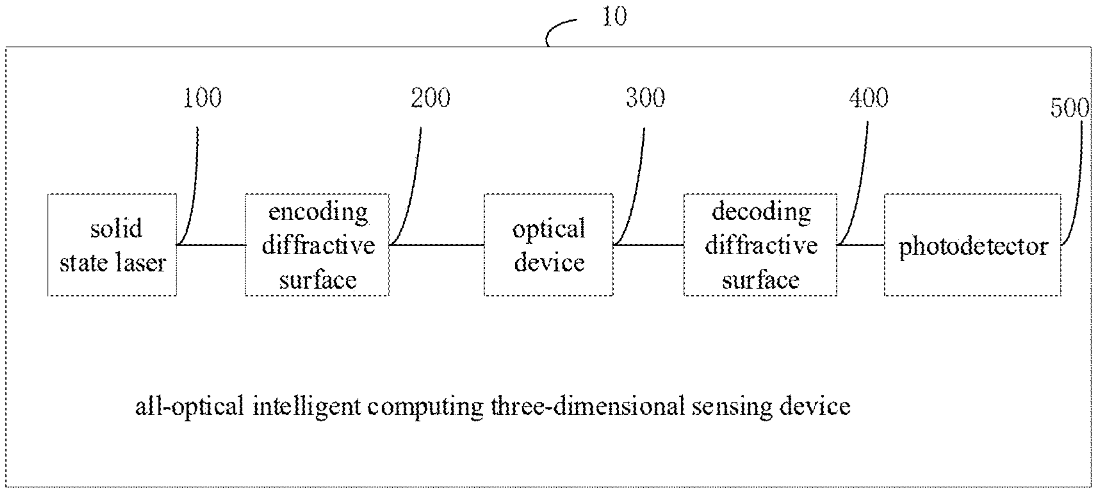
FIG. 12 is a schematic diagram of an all-optical intelligent computing three-dimensional perception device according to an embodiment of the present disclosure.

In order to realize the above embodiments, as illustrated in FIG. 12, the embodiment provides an all-optical intelligent computing three-dimensional perception device 10. The device includes: a solid state laser 100, an encoding diffractive surface 200, a plurality of optical elements 300, a decoding diffractive surface 400, and a photodetector 500.

The solid state laser 100 is configured to generate a laser beam.

The encoding diffractive surface 200 consists of a phase modulator based on encoding phase modulation information, is configured to modulate a wave-front phase based on the laser beam to generate a structured light with spatial pattern varying with depth.

The plurality of optical elements 300 are configured to irradiate the generated structured light onto a surface of an object.

The decoding diffractive surface 400 consists of a phase modulator based on decoding phase modulation information, is configured to map depth information in the structured light reflected by the object to a light intensity of an output plane.

The photodetector 500 is configured to obtain light intensity information on the output plane for depth information acquisition to achieve three-dimensional perception.

The intelligent diffractive surface consists of a phase modulator. The phase modulator can be realized by methods such as a SLM or a phase plate made of a specific material. The phase modulator can determine a light amplitude modulation coefficient and a light phase modulation coefficient of each pixel. Each pixel is an optical neuron. The intelligent diffractive surfaces can form a neural network with a specific function through free space propagation to realize tasks such as intelligent computation and feature learning.

With the all-optical intelligent computing three-dimensional perception device of the embodiment of the present disclosure, light-speed and post processing-free three-dimensional perception can be achieved through diffractive surfaces. The present disclosure works by encoding the depth information into the spatial pattern of the custom structured light and decoding it into the output light intensity through diffractive surface-optimized optical interconnections. Unlike the use of reconstruction algorithms, three-dimensional maps are immediately recorded using two-dimensional sensors, and the captured light intensity directly represents the depth information. The present disclosure provides a new idea for the three-dimensional perception, which greatly simplifies the three-dimensional perception process and supports the next generation of high-speed, low-power three-dimensional perception technology.

In the present disclosure, the reference terms "an embodiment", "some embodiments", "example", "specific example", and "some examples" and the like are intended to describe specific features, structures, materials, or characteristics described in combination with the embodiments or examples are included in at least one embodiment or example of the present disclosure. In the present disclosure, the schematic expressions of the above terms do not have to be directed to the same embodiments or examples. Moreover, the specific features, structures, materials, or characteristics described may be combined in a suitable manner in any one or more embodiments or examples. In addition, without contradicting each other, those skilled in the art may combine different embodiments or examples described in this present disclosure and features of different embodiments or examples.

In addition, terms such as "first" and "second" are used herein for purposes of description and are not intended to indicate or imply relative importance or to imply the number of technical features indicated. The feature defined with "first" or "second" may explicitly or implicitly include at least one of these features. In the description of the present disclosure, "a plurality of" means at least two, for example, two or three, unless specified otherwise.

What is claimed is:

1. An optical superpixel modeling and training method for three-dimensional perception for arbitrarily shaped objects, applied to an all-optical intelligent computing three-dimensional perception device, wherein the all-optical intelligent computing three-dimensional perception device comprises: a solid state laser, an encoding diffractive surface, a plurality of optical elements, a decoding diffractive surface, and a photodetector; wherein, the solid state laser is configured to generate a laser beam; the encoding diffractive surface consists of a phase modulator based on encoding phase modulation information, configured to modulate a wave-front phase based on the laser beam to generate a structured light with spatial pattern varying with depth; the plurality of optical elements are configured to irradiate the generated structured light onto a surface of an object; the decoding diffractive surface consists of a phase modulator based on decoding phase modulation information, configured to map depth information in the structured light reflected by the object to a light intensity of an output plane; and the photodetector is configured to obtain light intensity information on the output plane for a depth information acquisition to achieve the three-dimensional perception; and the method comprises:

constructing first training data based on a preset first superpixel optimized region;

training first neuron data in the encoding diffractive surface and the decoding diffractive surface of a superpixel using the first training data, to determine first target depth information according to the depth information in the spatial pattern of the structured light of an encoding superpixel and a reflected optical pattern of the structured light of a decoding superpixel;

mapping the first target depth information to the light intensity of a region of interest of the output plane by an intelligent optimized optical connection; and obtaining, by the photodetector, the light intensity information on the output plane for the depth information acquisition to achieve the three-dimensional perception.

2. The method of claim 1, further comprising:

optimizing the encoding superpixel and the decoding superpixel, to constrain propagation of the structured light within a superpixel region to obtain a structured light constraint result; and replicating and splicing the optimized encoding superpixel and the optimized decoding superpixel based on the structured light constraint result to obtain the encoding diffractive surface and the decoding diffractive surface, respectively.

3. The method of claim 1, wherein the first training data comprises a training set, a test set, and a loss function, and the first neuron data comprises an amplitude modulation coefficient and a phase modulation coefficient of neuron.

4. A superpixel classification modeling and training method for a robust three-dimensional perception for an arbitrarily shaped object under different illumination and reflectivity conditions, performed by an all-optical intelligent computing three-dimensional perception device, wherein the all-optical intelligent computing three-dimensional perception device comprises: a solid state laser, an encoding diffractive surface, a plurality of optical elements, a decoding diffractive surface, and a photodetector; wherein, the solid state laser is configured to generate a laser beam; the encoding diffractive surface consists of a phase modulator based on encoding phase modulation information, configured to modulate a wave-front phase based on the laser beam to generate a structured light with spatial pattern varying with depth; the plurality of optical elements are configured to irradiate the generated structured light onto a surface of an object; the decoding diffractive surface consists of a phase modulator based on decoding phase modulation information, configured to map depth information in the structured light reflected by the object to a light intensity of an output plane; and the photodetector is configured to obtain light intensity information on the output plane for a depth information acquisition to achieve the three-dimensional perception; and the method comprises:

constructing second training data based on a preset second superpixel optimized region;

training second neuron data in the encoding diffractive surface and the decoding diffractive surface of a superpixel using the second training data, to determine second target depth information according to the depth information in the spatial pattern of the structured light of an encoding superpixel and a reflected optical pattern of the structured light of a decoding superpixel;

classifying the second target depth information into a first preset number of depth intervals, and mapping the first preset number of depth intervals to a second preset number of preset regions on the output plane, to determine a region where a maximum light intensity is located as a classification result; and obtaining, by the photodetector, the light intensity information on the output plane for the depth information acquisition to achieve the three-dimensional perception.

5. The method of claim 4, wherein the second training data comprises a training set, a test set, and a loss function, and the second neuron data comprises an amplitude modulation coefficient and a phase modulation coefficient of neuron.

6. An optical global modeling and training method for an object with priori shape information, applied to an all-optical intelligent computing three-dimensional perception device, wherein the all-optical intelligent computing three-dimensional perception device comprises: a solid state laser, an encoding diffractive surface, a plurality of optical elements, a decoding diffractive surface, and a photodetector; wherein, the solid state laser is configured to generate a laser beam; the encoding diffractive surface consists of a phase modulator based on encoding phase modulation information, configured to modulate a wave-front phase based on the laser beam to generate a structured light with spatial pattern varying with depth; the plurality of optical elements are configured to irradiate the generated structured light onto a surface of the object; the decoding diffractive surface consists of a phase modulator based on decoding phase modulation information, configured to map depth information in the structured light reflected by the object to a light intensity of an output plane; and the photodetector is configured to obtain light intensity information on the output plane for a depth information acquisition to achieve a three-dimensional perception; and the method comprises:

constructing third training data based on an optimized region with a global size;

training third neuron data in the encoding diffractive surface and the decoding diffractive surface of a superpixel using the third training data, to form the encoding diffractive surface and the decoding diffractive surface according to the depth information in the spatial pattern of the structured light of an encoding superpixel and a reflected optical pattern of the structured light of a decoding superpixel;

obtaining, by the photodetector, the light intensity information on the output plane for the depth information acquisition to achieve the three-dimensional perception; and retrieving a region depth according to a preset demand based on the light intensity of the output region of the encoding diffractive surface and the decoding diffractive surface.

7. The method of claim 6, wherein the encoding diffractive surface and the decoding diffractive surface are formed by:

optimizing the encoding superpixel and the decoding superpixel, to constrain propagation of the structured light within a superpixel region to obtain a structured light constraint result; and replicating and splicing the optimized encoding superpixel and the optimized decoding superpixel based on the structured light constraint result to obtain the encoding diffractive surface and the decoding diffractive surface, respectively.

8. The method of claim 6, wherein the third training data comprises a training set, a test set, and a loss function, and the third neuron data comprises an amplitude modulation coefficient and a phase modulation coefficient of neuron.

* * * * *